(12) United States Patent
Byun et al.

(10) Patent No.: US 10,887,907 B2
(45) Date of Patent: Jan. 5, 2021

(54) METHOD AND APPARATUS FOR PERFORMING SCHEDULING REQUEST FOR UPLINK DATA TRANSMISSION IN WIRELESS COMMUNICATION SYSTEM

(71) Applicant: LG ELECTRONICS INC., Seoul (KR)

(72) Inventors: Ilmu Byun, Seoul (KR); Sangrim Lee, Seoul (KR); Yunjung Yi, Seoul (KR); Kijun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/346,090

(22) PCT Filed: Oct. 17, 2017

(86) PCT No.: PCT/KR2017/011433
§ 371 (c)(1),
(2) Date: Apr. 29, 2019

(87) PCT Pub. No.: WO2018/084457
PCT Pub. Date: May 11, 2018

(65) Prior Publication Data
US 2020/0059949 A1    Feb. 20, 2020

Related U.S. Application Data

(60) Provisional application No. 62/417,323, filed on Nov. 4, 2016.

(51) Int. Cl.
*H04W 72/12*  (2009.01)
*H04W 72/04*  (2009.01)

(52) U.S. Cl.
CPC ..... *H04W 72/1284* (2013.01); *H04W 72/042* (2013.01); *H04W 72/1268* (2013.01); *H04W 72/1289* (2013.01)

(58) Field of Classification Search
CPC ... H04W 72/1289; H04W 4/70; H04W 72/04; H04W 72/12; H04W 72/1294;
(Continued)

(56) References Cited

U.S. PATENT DOCUMENTS 10,251,191 B2 * 4/2019 Lee ................. H04W 76/10
2013/0044699 A1 * 2/2013 Eriksson ......... H04W 72/1289
370/329

(Continued)

FOREIGN PATENT DOCUMENTS

EP    2802187    11/2014

OTHER PUBLICATIONS

PCT International Application No. PCT/KR2017/011433, International Search Report dated Jan. 23, 2018, 6 pages.
(Continued)

*Primary Examiner* — Hanh N Nguyen
(74) *Attorney, Agent, or Firm* — Lee Hong Degerman Kang Waimey

(57) ABSTRACT

A method and apparatus for performing a scheduling request for transmitting uplink data in a wireless communication system are provided. Specifically, a terminal receives allocation information for a first SR resource that is semi-statically allocated from a base station. The terminal receives allocation information for a second SR resource dynamically allocated from the base station. The second SR resource is additionally allocated in addition to the first SR resource for a buffer status report (BSR). At this time, the allocation information for the first SR resource comprises: mapping information between the first and second SR resources and buffer size information. The terminal transmits an SR to the base station through the first SR resource or the second SR resource.

18 Claims, 13 Drawing Sheets

(58) Field of Classification Search
CPC ........... H04W 72/1268; H04W 72/042; H04W 72/1284; H04L 5/00; H04L 27/26
See application file for complete search history.

(56) References Cited

U.S. PATENT DOCUMENTS

| | | |
|---|---|---|
| 2015/0146677 A1* | 5/2015 | Ito .......................... H04W 4/70 370/329 |
| 2015/0173099 A1 | 6/2015 | Sun et al. |
| 2016/0165633 A1 | 6/2016 | Ostergaard et al. |
| 2016/0192390 A1 | 6/2016 | Lee et al. |

OTHER PUBLICATIONS

Intel, "Scheduling request design for NR", 3GPP TSG RAN WG1 Meeting #86bis, R1-1610191, Oct. 2016, 7 pages.

* cited by examiner

METHOD AND APPARATUS FOR PERFORMING SCHEDULING REQUEST FOR UPLINK DATA TRANSMISSION IN WIRELESS COMMUNICATION SYSTEM

CROSS-REFERENCE TO RELATED APPLICATIONS

This application is the National Stage filing under 35 U.S.C. 371 of International Application No. PCT/KR2017/011433, filed on Oct. 17, 2017, which claims the benefit of U.S. Provisional Application No. 62/417,323, filed on Nov. 4, 2016, the contents of which are all hereby incorporated by reference herein in their entirety.

BACKGROUND OF THE INVENTION

Field of the Invention

The present specification relates to wireless communication, and more particularly, to a method of performing a scheduling request for uplink data transmission in a wireless communication system, and an apparatus using the method.

Related Art

A wireless communication system is widely deployed to provide various types of communication services, such as voice and data. An object of a wireless communication system is to enable a plurality of terminals to perform reliable communication regardless of their locations and mobility.

In general, a wireless communication system is a multiple access system capable of supporting communication with a plurality of terminals by sharing available radio resources. Examples of radio resources include time, a frequency, code, transmission power and so on. Examples of a multiple access system includes a time division multiple access (TDMA) system, a code division multiple access (CDMA) system, a frequency division multiple access (FDMA) system, an orthogonal frequency division multiple access (OFDMA) system, a single carrier frequency division multiple access (SC-FDMA) system and so on.

A base station (BS) properly allocates radio resources to each piece of user equipment (UE) within a cell through scheduling. The UE may transmit control information or user data to the BS using the allocated radio resources. In this case, a method for transmitting control information and a method for transmitting user data may be different. Furthermore, a method for allocating radio resources for control information and a method for allocating radio resources for user data may be different. Accordingly, radio resources for control information and radio resources for user data may be different. A BS may differently manage radio resources reserved for control information and radio resources reserved for user data.

In a mobile communication system, data is transmitted/received through a resource allocation process based on BS scheduling to maximize resource utilization, which may lead to an increase in latency of uplink data transmission of a UE. Accordingly, a method of performing a multi-level scheduling request is proposed to minimize the latency of the UE.

SUMMARY OF THE INVENTION

The present specification provides a method and apparatus for performing a scheduling request for uplink data transmission in a wireless communication system.

The present specification provides a method and apparatus for performing a scheduling request for uplink data transmission in a wireless communication system.

The apparatus includes a radio frequency (RF) unit transmitting and receiving a radio signal, and a processor coupled to the RF unit.

The present embodiment proposes a scheme of performing a multi-level scheduling request. The multi-level scheduling request is a scheme of simultaneously transmitting a scheduling request (SR) and a buffer status report (BSR) by allocating not only the existing SR but also an additional SR resource. Additional BSR transmission can be omitted by using the multi-level SR scheme.

Summarizing terminologies, a first SR resource may correspond to the existing SR resource. Therefore, if only the first SR resource is allocated, a single-level SR is performed. A second SR resource may correspond to an additional SR resource additionally allocated for a BSR. A multi-level SR can be performed by using the first SR resource and/or the second SR resource.

A user equipment (UE) receives allocation information for the first SR resource from a base station (BS). The first SR resource is semi-statically and periodically allocated. However, the allocation information for the first SR resource may be aperiodically received. In this case, the allocation information for the first SR resource may be received through a radio resource control (RRC) message.

The UE receives allocation information for a second SR resource from the BS. The second SR resource is dynamically and aperiodically allocated. The second SR resource is additionally allocated in addition to the first SR resource for a buffer status report (BSR). In this case, the allocation information for the second SR resource may be received through L1 signaling.

The second SR resource may be allocated according to a resource state of an uplink control channel. Specifically, the second SR resource may be allocated to a resource other than a resource allocated to transmit channel quality information (CQI) or ACK/NACK for downlink data in the uplink control channel. That is, when the BS does not dynamically schedule downlink data, the second SR resource may be allocated to the remaining resource of the uplink control channel. In this case, the uplink control channel is a physical uplink control channel (PUCCH).

That is, in the present embodiment, the BS may allocate a multi-level SR resource by combining a semi-statistic scheduling scheme and a dynamic scheduling scheme.

The UE transmits an SR to the BS through the first SR resource and the second SR resource.

The UE receives an uplink (UL) grant determined according to a resource on which the SR is transmitted from the BS.

The UE transmits the uplink data through an uplink data channel allocated by the UL grant. In this case, the uplink control channel is a physical uplink control channel (PUCCH).

If the resource on which the SR is transmitted is the first SR resource, the RRC message may include information indicating whether the BSR is transmitted through the uplink data channel.

When the resource on which the SR is transmitted is the first SR resource and the second SR resource, the BSR may be transmitted together with the SR. That is, according to a multi-level SR in which the first SR resource and the second SR resource are used, the UE may transmit the SR and the BSR simultaneously to the BS through the multi-level SR resource.

For this, the allocation information for the first SR resource includes mapping information between buffer size information and the first and second SR resources. Accordingly, an optimal mapping relation between the multi-level SR and the buffer size information (or level) may be determined.

When the UE fails to receive the allocation information for the second SR resource, the SR may be transmitted only through the first SR resource. The buffer size information may include a first buffer size level mapped to the first SR resource and a second buffer size level mapped to the second SR resource. A minimum buffer size of the first buffer size level may be greater than or equal to a maximum buffer size of the second buffer size level. The first SR resource allocated semi-statically and periodically is more reliable than the second SR resource allocated dynamically and aperiodically. Therefore, upon failure in reception of the allocation information for the second SR resource, the UE may transmit the SR by using only the first SR resource. In this case, since a first buffer size level which is mapped to the first SR resource may be the greatest buffer size, the UE may transmit uplink data without an additional latency.

The first buffer size level and the second buffer size level may correspond to values obtained by quantizing a buffer size of the uplink data on a size basis.

In addition, the SR may always be transmitted through the first SR resource irrespective of whether the allocation information for the second SR resource is successfully received.

In addition, the SR may correspond to a sequence to which an on-off keying scheme is applied. A buffer size included in the buffer size information for a case where the SR is transmitted using L sequences may be set to be greater than or equal to a buffer size included in the buffer size information for a case where the SR is transmitted using (L+1) sequences. This is because a probability of detecting a smaller number of SR sequences is higher than a probability of detecting a greater number of SR sequences. In this case, L is a natural number.

The use of the proposed method has an advantage in that a scheduling request resource can be effectively used compared to a case where a multi-level scheduling request resource is semi-statically allocated. In addition, advantageously, a latency time until uplink transmission can be decreased compared to a single-level scheduling request.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink.

For clarity of explanation, the following description will focus on the 3GPP LTE/LTE-A. However, technical features of the present invention are not limited thereto.

Figure 1:
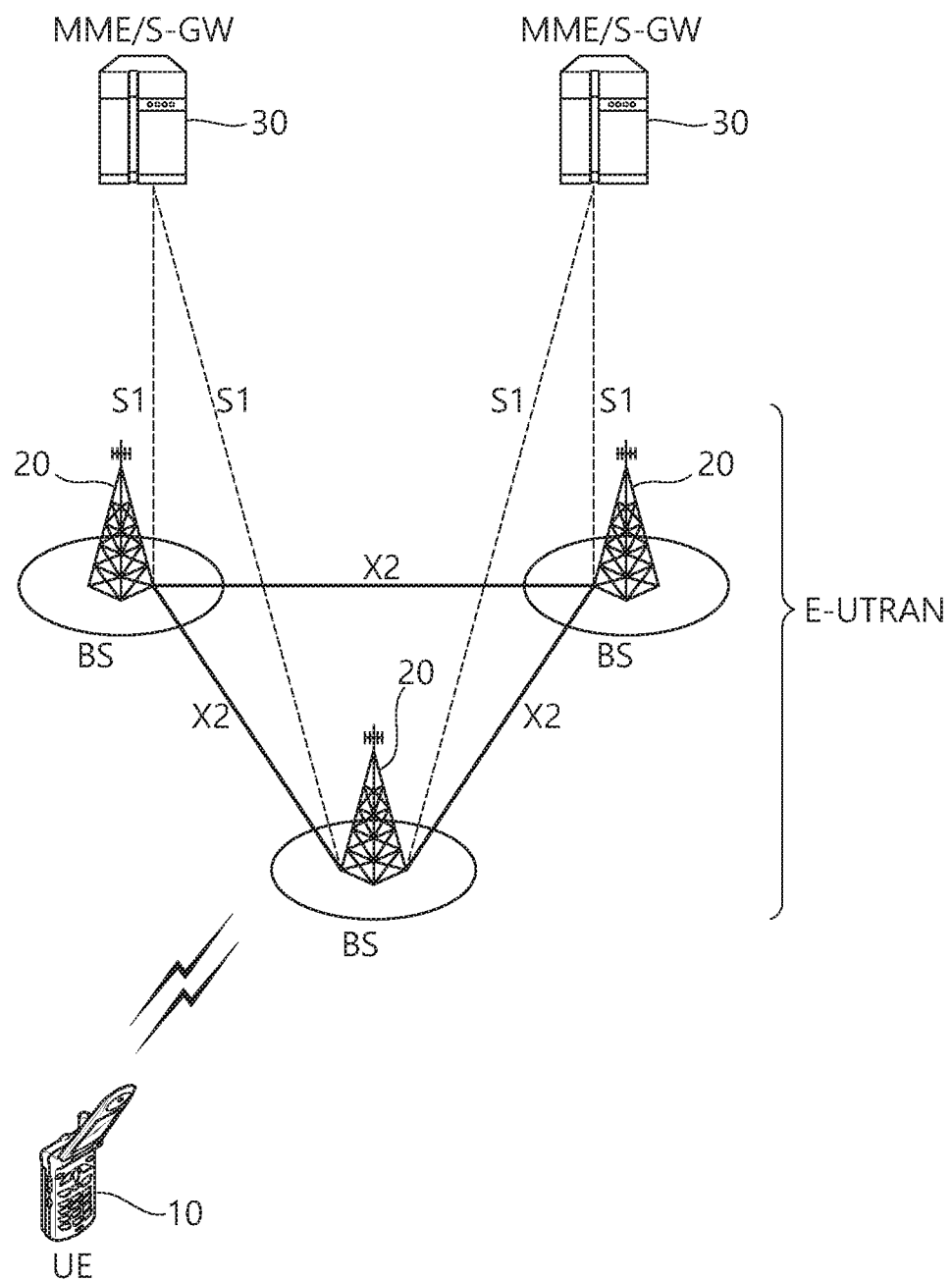
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

A radio interface between the UE and the BS is called a Uu interface. Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
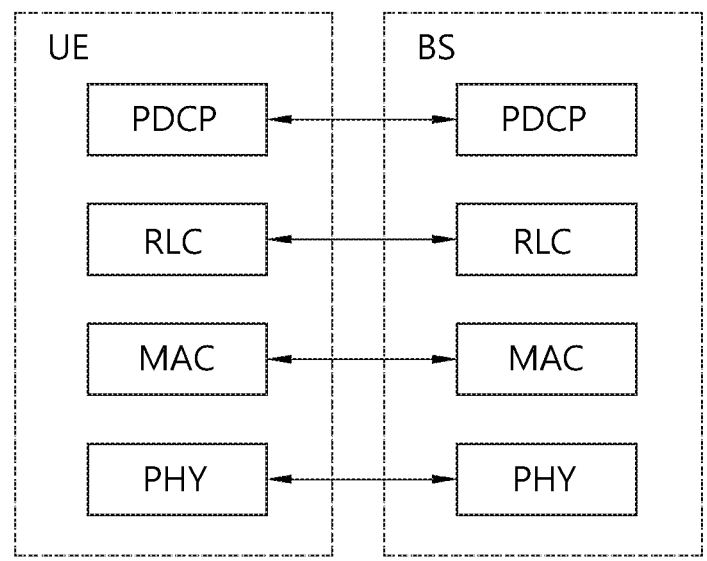
FIG. 2 is a diagram illustrating a radio protocol architecture for a user plane.
Figure 3:
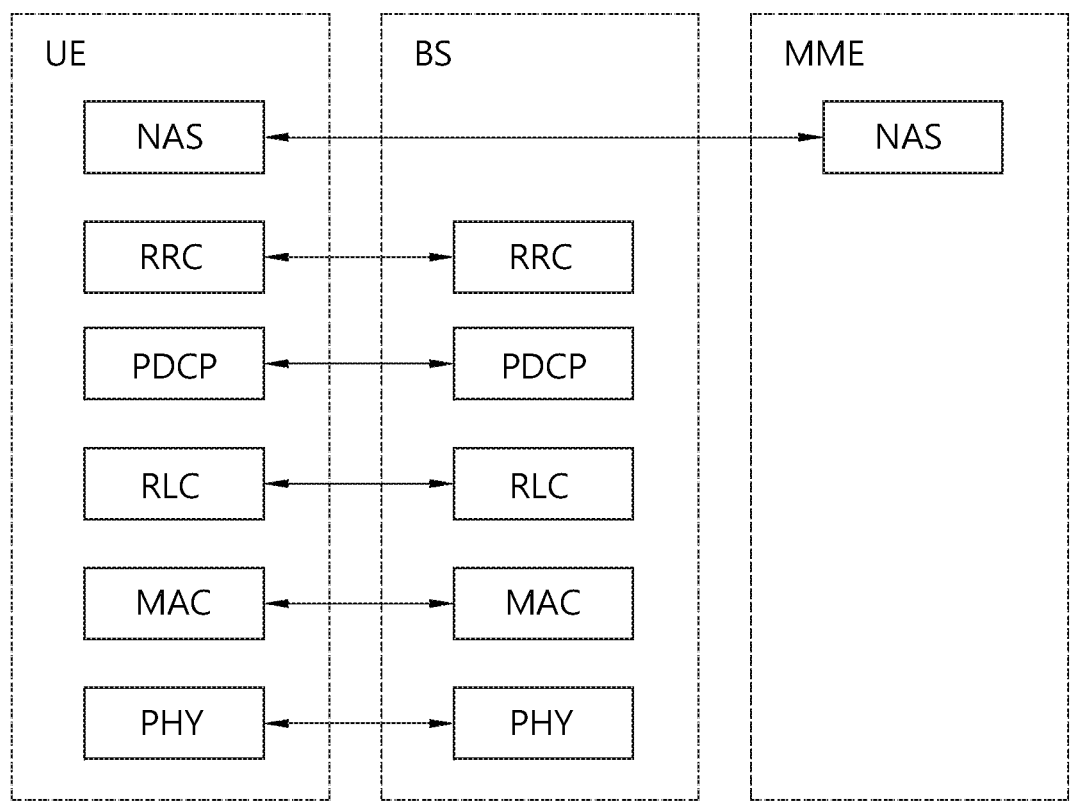
FIG. 3 is a diagram illustrating a radio protocol architecture for a control plane.

FIG. 2 is a diagram illustrating a radio protocol architecture for a user plane. FIG. 3 is a diagram illustrating a radio protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transmitted through a radio interface.

Between different PHY layers, i.e., a PHY layer of a transmitter and a PHY layer of a receiver, data are transferred through the physical channel. The physical channel is modulated using an orthogonal frequency division multiplexing (OFDM) scheme, and utilizes time and frequency as a radio resource.

A function of the MAC layer includes mapping between a logical channel and a transport channel and multiplexing/de-multiplexing on a transport block provided to a physical channel over a transport channel of a MAC service data unit (SDU) belonging to the logical channel. The MAC layer provides a service to a radio link control (RLC) layer through the logical channel.

A function of the RLC layer includes RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

Functions of a packet data convergence protocol (PDCP) layer in the user plane include user data delivery, header compression, and ciphering. Functions of a PDCP layer in the control plane include control-plane data delivery and ciphering/integrity protection.

A radio resource control (RRC) layer is defined only in the control plane. The RRC layer serves to control the logical channel, the transport channel, and the physical channel in association with configuration, reconfiguration and release of radio bearers (RBs).

An RB is a logical path provided by the first layer (i.e., the PHY layer) and the second layer (i.e., the MAC layer, the RLC layer, and the PDCP layer) for data delivery between the UE and the network. The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the network, the UE is in an RRC connected state, and otherwise the UE is in an RRC idle state.

Data is transmitted from the network to the UE through a downlink transport channel Examples of the downlink transport channel include a broadcast channel (BCH) for transmitting system information and a downlink-shared channel (SCH) for transmitting user traffic or control messages. The user traffic of downlink multicast or broadcast services or the control messages can be transmitted on the downlink-SCH or an additional downlink multicast channel (MCH). Data are transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

Hereinafter, semi-static scheduling or semi-persistent scheduling (SPS) is described. In the following, the terms are unified by semi-static scheduling.

In a next-generation communication system, the SPS is required for a plurality of UEs. An Internet of Things (IoT) service of various industries is expected to be introduced in the next-generation communication system. Representative examples thereof include an automobile, a drone, or the like. In these services, location information is expected to be updated in unit of 100 millisecond (ms) to 1 second (s) to manage autonomous driving and to prevent accidents. When the location information is updated periodically, the SPS is applied in general to decrease an overhead of an unnecessary control channel.

Figure 4:
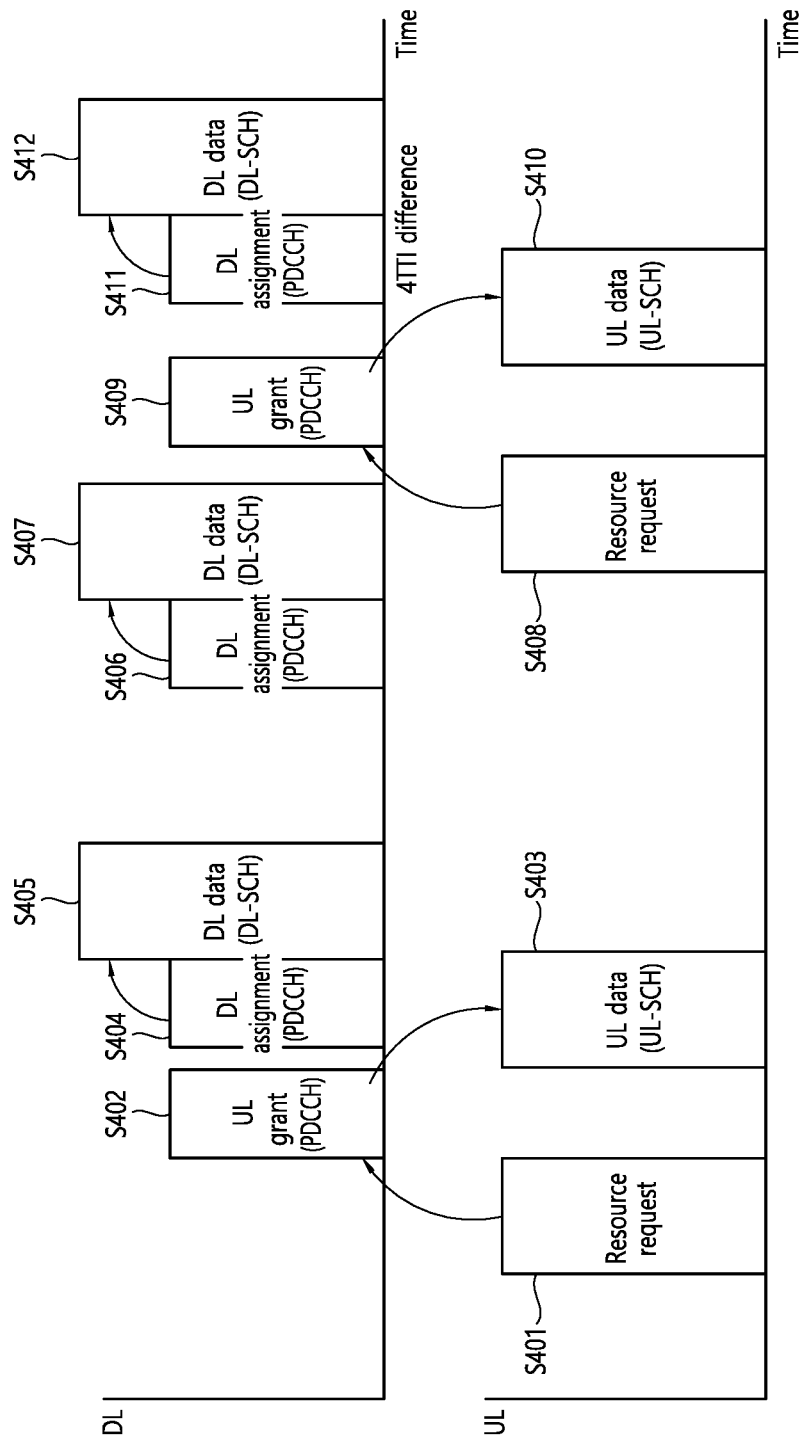
FIG. 4 shows a process of an operation performed between a user equipment (UE) and an eNodeB (eNB) in a contention-based random access procedure.
Figure 5:
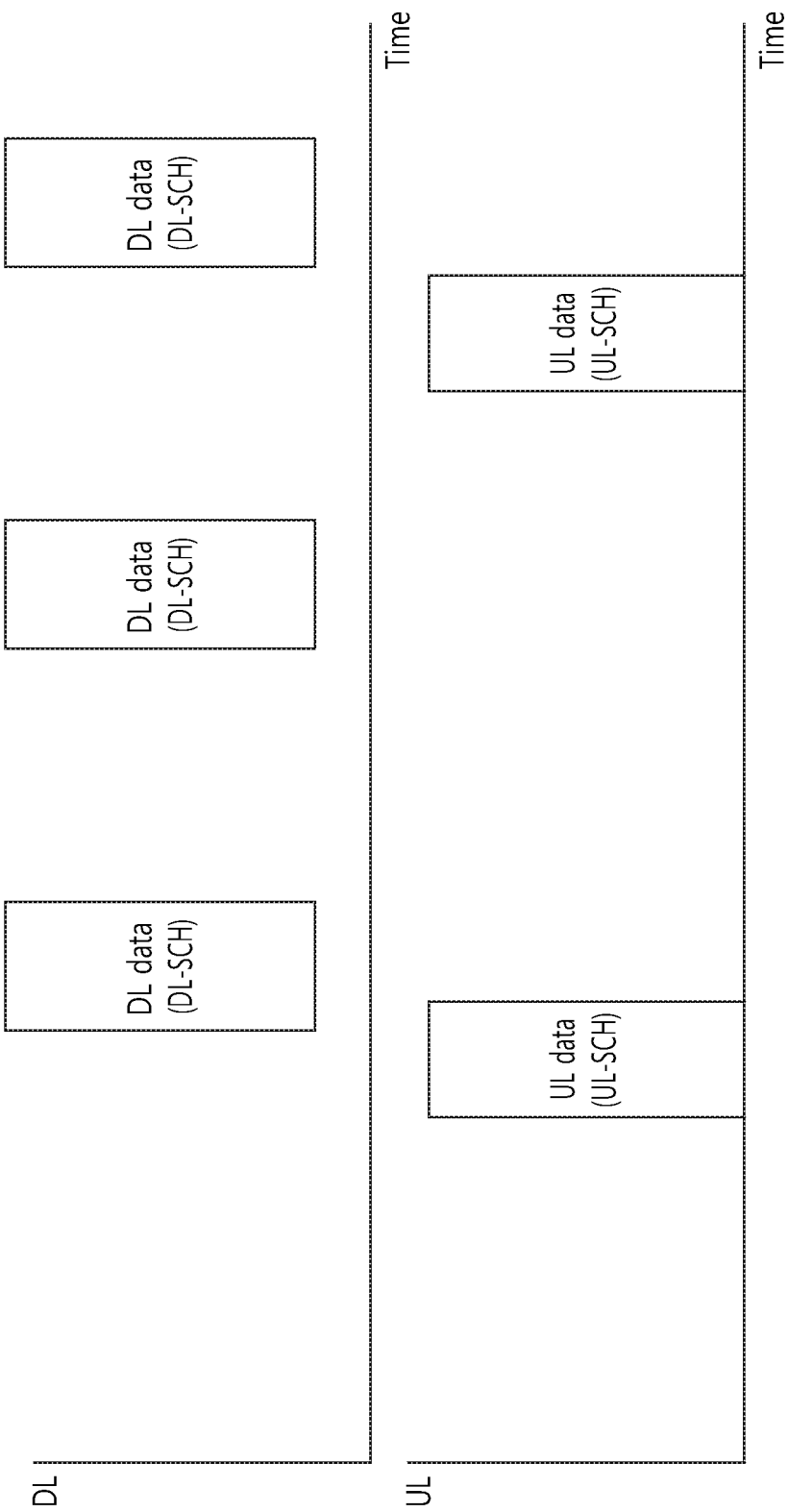
FIG. 5 is a drawing for explaining a method of dynamically assigning a radio resource.

FIG. 4 is a drawing for explaining a method of dynamically assigning a radio resource. FIG. 5 is a drawing for explaining an SPS method.

A typical process of transmitting data from a UE to an eNB (a method of dynamically assigning a radio resource) is described below with reference to FIG. 4. First, the UE may request the eNB to provide a radio resource required for transmission of generated data (S401). Therefore, the eNB may assign the radio resource through a control signal according to a radio resource request of the UE (S402). In an LTE system, the resource assignment of the eNB for transmitting UL data of the UE may be transmitted through a UL grant transmitted through a PDCCH. Therefore, the UE may transmit data to the eNB through the assigned radio resource (S403). The radio resource request of the UE, the resource assignment of the eNB, and corresponding UL data transmission of the UE may be optionally repeated (S408 to S410)

Meanwhile, when the eNB transmits downlink (DL) data to the UE, a DL assignment message may be transmitted to the UE through the PDCCH to know through which radio resource the data transmitted to the UE is transmitted (S504), and the eNB may transmit data to the UE through a radio resource corresponding to the DL assignment message (S405). In this case, DL assignment information transmission and DL data transmission through a radio resource corresponding thereto may be achieved in the same transmission time interval (TTI). Further, as shown in FIG. 4, the DL data transmission procedure may be repeated.

A method of assigning an SPS radio resource is a method in which first and second steps are skipped in three steps for transmitting data to the eNB (i.e., (1) the resource request of the UE, (2) the resource assignment of the eNB, and (3) the data transmission of the UE according to the resource assignment). Accordingly, the UE may perform a process of transmitting data directly without the aforementioned first and second steps, i.e., the step of requesting the radio resource and the step of assigning the radio resource, on the basis of a configuration of the radio resource. The concept of the SPS method is shown in FIG. 5. That is, in the SPS method, the eNB does not have to transmit radio resource assignment information all the time through the PDCCH.

Hereinafter, a buffer status report (BSR) is described.

The BSR corresponds to information which is fed back by a UE to an eNB by considering a transmission data size of the UE. Table 1 below shows an example of setting a buffer size level according to the BSR.

TABLE 1

| Index | Buffer Size value [bytes] |
|---|---|
| 0 | BS = 0 |
| 1 | 0 < BS <= 10 |
| 2 | 10 < BS <= 12 |
| 3 | 12 < BS <= 14 |
| 4 | 14 < BS <= 17 |
| 5 | 17 < BS <= 19 |
| 6 | 19 < BS <= 22 |
| 7 | 22 < BS <= 26 |
| 8 | 26 < BS <= 31 |
| 9 | 31 < BS <= 36 |
| 10 | 36 < BS <= 42 |
| 11 | 42 < BS <= 49 |
| 12 | 49 < BS <= 57 |
| 13 | 57 < BS <= 67 |
| 14 | 67 < BS <= 78 |
| 15 | 78 < BS <= 91 |
| 16 | 91 < BS <= 107 |
| 17 | 107 < BS <= 125 |
| 18 | 125 < BS <= 146 |
| 19 | 146 < BS <= 171 |
| 20 | 171 < BS <= 200 |
| 21 | 200 < BS <= 234 |
| 22 | 234 < BS <= 274 |
| 23 | 274 < BS <= 321 |
| 24 | 321 < BS <= 376 |
| 25 | 376 < BS <= 440 |
| 26 | 440 < BS <= 515 |
| 27 | 515 < BS <= 603 |
| 28 | 603 < BS <= 706 |
| 29 | 706 < BS <= 826 |
| 30 | 826 < BS <= 967 |
| 31 | 967 < BS <= 1132 |
| 32 | 1132 < BS <= 1326 |
| 33 | 1326 < BS <= 1552 |
| 34 | 1552 < BS <= 1817 |
| 35 | 1817 < BS <= 2127 |
| 36 | 2127 < BS <= 2490 |
| 37 | 2490 < BS <= 2915 |
| 38 | 2915 < BS <= 3413 |
| 39 | 3413 < BS <= 3995 |
| 40 | 3995 < BS <= 4677 |
| 41 | 4677 < BS <= 5476 |
| 42 | 5476 < BS <= 6411 |
| 43 | 6411 < BS <= 7505 |
| 44 | 7505 < BS <= 8787 |
| 45 | 8787 < BS <= 10287 |
| 46 | 10287 < BS <= 12043 |

TABLE 1-continued

| Index | Buffer Size value [bytes] |
|---|---|
| 47 | 12043 < BS <= 14099 |
| 48 | 14099 < BS <= 16507 |
| 49 | 16507 < BS <= 19325 |
| 50 | 19325 < BS <= 22624 |
| 51 | 22624 < BS <= 26487 |
| 52 | 26487 < BS <= 31009 |
| 53 | 31009 < BS <= 36304 |
| 54 | 36304 < BS <= 42502 |
| 55 | 42502 < BS <= 49759 |
| 56 | 49759 < BS <= 58255 |
| 57 | 58255 < BS <= 68201 |
| 58 | 68201 < BS <= 79846 |
| 59 | 79846 < BS <= 93479 |
| 60 | 93479 < BS <= 109439 |
| 61 | 109439 < BS <= 128125 |
| 62 | 128125 < BS <= 150000 |
| 63 | BS > 150000 |

Referring to Table 1, the UE divides a UL data size into 64 levels and transmits information regarding the UL data size to the eNB by using a BSR of 6 bits. For example, if UL data to be transmitted by the UE has a size of 350 bytes, the UE transmits an index value of 24 to the eNB by using the BSR of 6 bits.

In a UL case, the eNB configures a memory of a soft buffer on the basis of BSR information received from the UE. That is, a soft buffer size for each UE is a space in which a soft buffer value is stored before channel decoding, and the eNB shall know the BSR information.

If the eNB does not know the BSR information, the eNB has to set the size of the soft buffer by assuming that the size of the UL data is the greatest data size. As such, if the size of the soft buffer is set by assuming the greatest data size, disadvantageously, this causes waste of a memory of the eNB.

Likewise, if the eNB configures the soft buffer by assuming any data size, the eNB does not know which size of data will be transmitted from the UE. As a result, a case where the data cannot be written in the soft buffer (that is, a case where UL data is greater than the size of the soft buffer) may occur. Eventually, if the eNB configures any soft buffer as such, disadvantageously, a UL data loss may occur even though channel decoding is possible in the eNB.

As such, according to the conventional method, in order for the UE to transmit UL data to the eNB, the BSR is necessarily transmitted to the eNB. Therefore, a 5-step UL data transmission scheme (or when a UL resource for the BSR is allocated in advance, a 3-step UL data transmission scheme, see FIG. 6) is applied irrespective of a data size and a specific application from which the UL data is generated.

That is, the UE transfers information regarding UL data, which is intended to be transmitted by the UE, to the eNB through the BSR, and the eNB allocates a UL resource to the eNB on the basis of BSR information.

However, when the typical 5-step UL resource allocation process (or UL data transmission process) is performed, latency occurs inevitably due to UL data transmission. In particular, it is preferable to decrease the latency in order to rapidly transmit UL data generated in a range of a specific size (in particular, a small size) or UL data generated from a latency-sensitive application to the eNB.

Accordingly, as a method of omitting BSR transmission in order for the UE to transmit data with a specific size, the present specification proposes to omit BSR transmission and negotiate a buffer size to be used by default with the eNB in UL transmission for a service requiring a low latency, during a process in which the UE negotiates its capability.

If the method of omitting BSR transmission according to the present specification is used for rapid transmission of data with a small size in general, a data size for this may be a value which is not significantly changed.

In addition, the UE may desire to restrict data, to which the method of omitting BSR transmission is to be applied, to a specific service. A buffer size value to be set may differ for each UE according to a service feature.

Accordingly, the present specification proposes a scheduling request (SR) method in which BSR transmission can be omitted by allocating an additional SR for UL data of a specific size or a specific application and by setting a buffer size based on the additional SR differently for each UE and the service feature.

A multi-level SR proposed in the present specification is a method for simultaneously transmitting an SR and a BSR. The multi-level SR has a disadvantage in that many resources are used compared to the existing SR. The present specification proposes a scheme of effectively allocating a multi-level SR resource to minimize the disadvantage of the multi-level SR.

Figure 6:
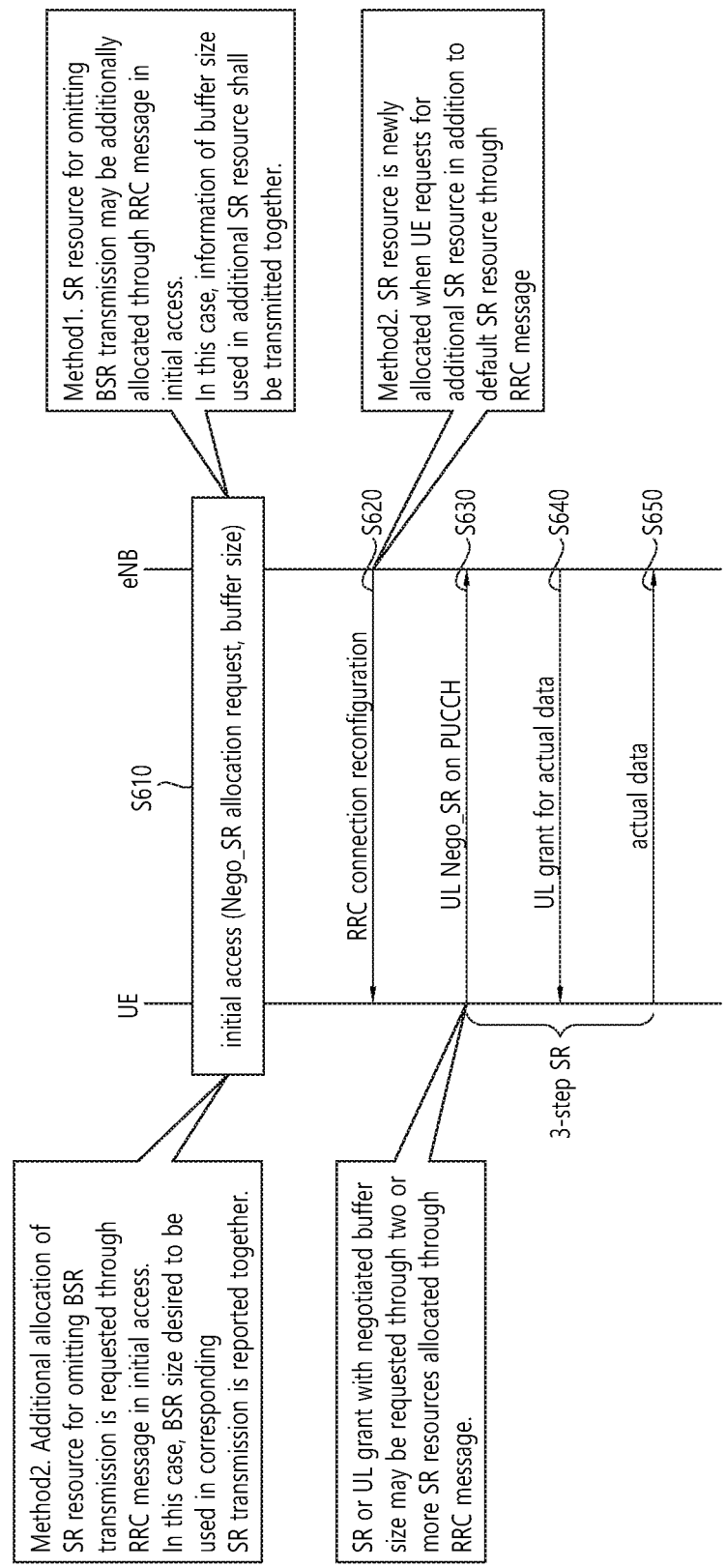
FIG. 6 shows an example of semi-statically allocating an additional scheduling request (SR) resource to a UE according to an embodiment of the present specification.

FIG. 6 shows an example of semi-statically allocating an additional SR resource to a UE according to an embodiment of the present specification.

According to FIG. 6, a multi-level SR resource may be semi-statically allocated. Specifically, FIG. 6 shows an example of determining a level of a multi-level SR through negotiation between a UE and an eNB. This has an advantage in that resource efficiency is improved compared to a case of fixing the multi-level SR resource.

That is, the embodiment of FIG. 6 is a method of applying a multi-level SR (a method of omitting BSR transmission) in order for a UE to transmit only data of a specific size. The UE may negotiate a buffer size to be used by default with the eNB when BSR transmission is omitted for a low-latency service, during a process in which the UE negotiates its capability. Such a negotiation of the buffer size may be predetermined by the eNB without a request of the UE (method 1), or may be additionally determined from the eNB at the request of the UE (method 2).

According to the method 1, an SR (or Nego_SR(negotiation SR)) resource is additionally allocated to the UE from the eNB when an initial access procedure is performed on a network (S610).

The SR is transmitted using an on/off keying scheme also in an additionally allocated SR resource in the same manner as an SR resource (i.e., an SR resource requiring UL data for BSR transmission) to be allocated by default to the eNB. However, the additionally allocated SR resource is configured with a PUCCH resource index different from that of an SR resource allocated by default to a corresponding UE. In addition, an SR periodicity or SR subframe offset different from that of the SR resource allocated by default may be configured.

In addition, a data size (or a data range) is determined in association with the SR resource additionally allocated to the UE. Accordingly, the eNB sets a buffer size on the basis of a data size corresponding to a corresponding SR resource upon receiving an SR on the SR resource additionally allocated (S610).

As such, since an SR resource is additionally allocated in addition to the SR resource allocated by default to the UE, the UE transmits an SR to the eNB through a plurality of PUCCH resources.

The eNB may additionally allocate an SR resource for omitting BSR transmission which is pre-configured in the eNB through an RRC message in an initial network access of the UE without negotiation with the UE. In this case, information of a buffer size used in the additional SR resource is transmitted together with the RRC message.

According to the method 2, an additional SR may be configured from the eNB at the request of the UE. In this case, the UE requests the eNB to additionally allocate the SR resource for omitting BSR transmission through the RRC message in the initial network access. In this case, a BSR size desired to be used in corresponding SR transmission is reported to the eNB together through the RRC message (S610).

When the eNB receives a request for an additional SR resource from the UE through the RRC message from the UE, the UE additionally allocates an additional SR resource in addition to the default SR resource. The eNB may configure the SR of the UE in RRC connection configuration or RRC connection reconfiguration with the UE (S620).

The UE transmits the SR to the eNB through a PUCCH resource for allocation of a PUSCH resource for UL data transmission (S630).

Herein, the UE may transmit the SR to the eNB in an SR resource configured by default or an SR resource additionally allocated. That is, the SR is transmitted through any one SR resource according to a size of UL data to be transmitted among two or more SR resources allocated through an RRC message.

Therefore, the eNB attempts SR detection on both the SR resource allocated by default to the UE and the SR resource additionally allocated.

A case where the SR is transmitted through the SR resource additionally allocated to the UE in step S630 is assumed in FIG. 6.

When the eNB receives the SR on the additionally allocated SR resource from the UE, the eNB acquires information of a data size determined in association with an additional SR resource, and transmits UL resource allocation information (i.e., a UL grant) for a PUSCH resource to the UE on the basis of a corresponding data size (S640).

Upon receiving a UL grant for actual data transmission from the eNB, the UE transmits the actual UL data to the eNB through a PUSCH resource allocated by the UL grant (S650).

As such, since the scheduling method according to the present specification configures a plurality of types of SR to a UE without a change of the existing PUCCH format, the existing 5-step SR procedure can be reduced to the 3-step SR procedure.

A case where a UE uses an additional SR resource is described.

Upon generation of UL data with a size equal to or less than a buffer size configured in the additional SR resource, a UE to which two or more SR resources are allocated (i.e., a UE to which an additional SR resource is allocated) transmits an SR to an eNB by using an SR resource corresponding to a buffer size configured for allocation of a PUSCH resource for corresponding data transmission (S630). The buffer size is informed in general as an integer value X.

More specifically, if one additional SR resource is configured in the UE, upon generation of data with a size equal to or less than the buffer size X configured in association with the additional SR resource, the UE may transmit the SR by using an SR resource defined for the buffer size X.

If three or more SRs are configured in the UE (i.e., if two or more additional SR resources are configured, 3-level SR), upon generation of UL data with a size exceeding an $(n-1)^{th}$ buffer size $X_{n-1}$ and less than or equal to an $n^{th}$ buffer size $X_n$, the UE may transmit the SR through an $n^{th}$ SR resource (or may request for a UL grant).

Figure 7:
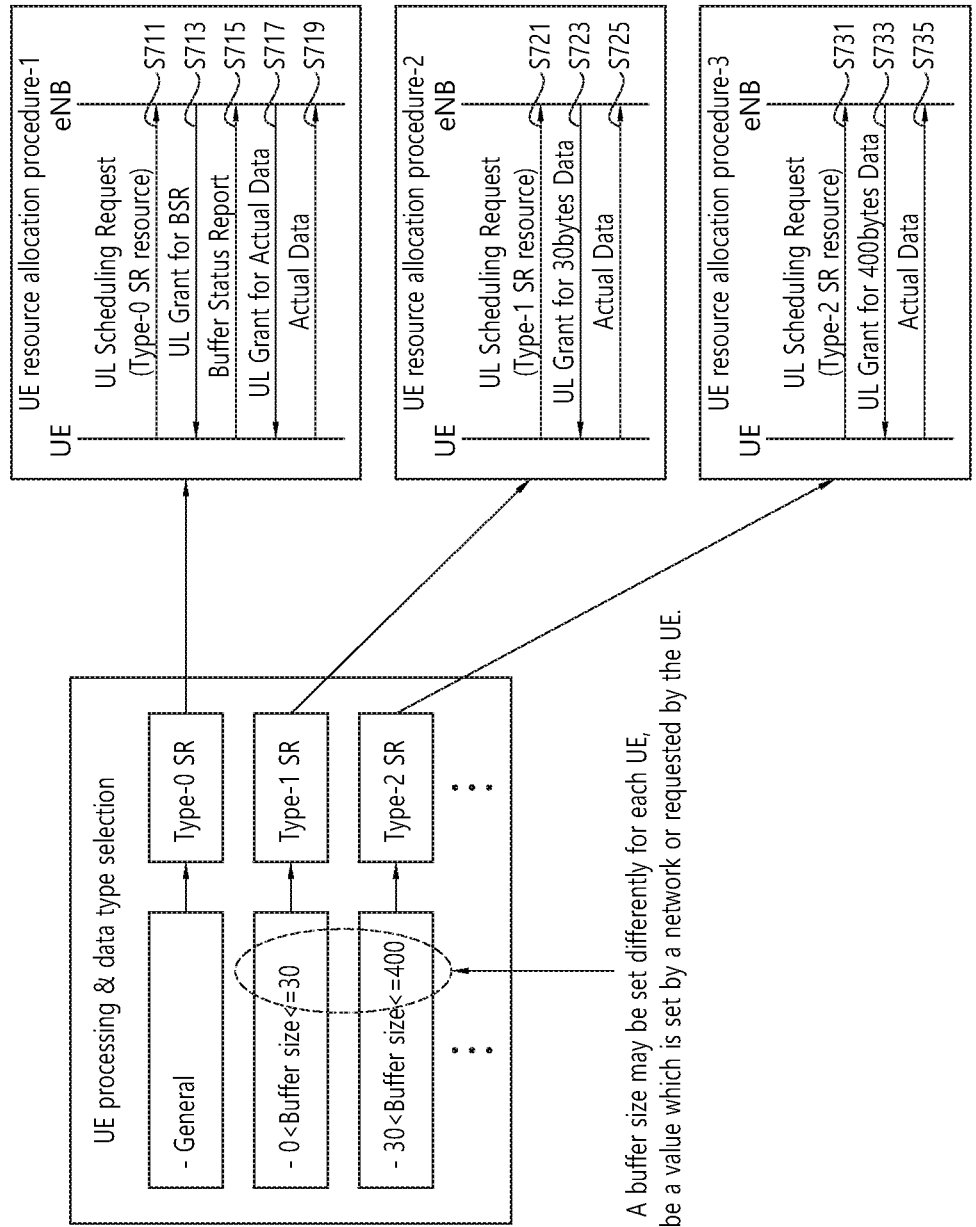
FIG. 7 is a drawing for explaining an uplink resource allocation procedure using an additional SR allocation resource according to an embodiment of the present specification.

FIG. 7 is a drawing for explaining a UL resource allocation procedure using an additional SR allocation resource according to an embodiment of the present specification.

First, a type-0 SR is an SR allocated by default to a UE, and may be used when the UE uses an SR procedure for typical UL data transmission.

Further, a type-1 SR is an SR additionally allocated to the UE, and may be used when the UE uses an SR procedure for transmission of UL data with a size in the range of a buffer size (0<buffer size≤30) which is set in the SR type.

Further, a type-2 SR is an SR additionally allocated to the UE, and may be used when the UE uses an SR procedure for transmission of UL data with a size in the range of a buffer size (30<buffer size≤400) which is set in the SR type.

The buffer size may be set differently for each UE. In addition, the buffer size may be a value which is set by a network or requested by the UE.

Hereinafter, a UL resource allocation process for the type-0 SR, the type-1 SR, and the type-2 SR is described.

A UE to which a plurality of SR types are configured transmits a scheduling request to the eNB for allocation of a PUSCH resource for UL data transmission (S711, S721, and S731).

Herein, the UE transmits to the eNB an SR type selected according to a size of UL data to be transmitted on a PUCCH.

As described above, a type of an SR transmitted by the UE is determined according to a resource on which the SR is transmitted. That is, the UE transmits the SR to the eNB through an SR resource corresponding to the selected SR type.

Such a plurality of SR resources may be configured in a UE-specific manner by a higher layer (e.g., RRC layer). In addition, the configuration of the plurality of SR resources may be dynamically changed or semi-statically changed.

In case of FIG. 7, if the UE transmits an SR in an SR resource corresponding to the type-0 SR, the eNB may identify that the received SR is the type-0 SR. Likewise, if the UE transmits the SR in the SR resource corresponding to the type-1 SR or the type-2 SR, the eNB may identify that the received SR is the type-1 or 2 SR.

The eNB determines an SR type according to an SR resource received from the UE, and proceeds a UL resource allocation process according to the determined SR type.

First, if the UE transmits the type-0 SR to the eNB, the eNB may perform a typical 5-step UL resource allocation procedure through energy detection (i.e., on/off detection) in a resource of the type-0 SR.

That is, the eNB transmits to the UE a UL grant for a PUSCH resource for BSR transmission (S713).

Upon receiving the UL grant for the BSR from the eNB, the UE transmits a triggered BSR to the eNB through a PUSCH resource allocated by the UL grant (S715).

The eNB confirms an amount of UL data transmitted actually by the UE through the BSR, and transmits to the UE a UL grant for a PUSCH resource for actual data transmission (S717). Herein, the eNB sets a soft buffer size corresponding to a size of UL data to be transmitted actually by the UE through the BSR.

Upon receiving the UL grant for actual data transmission from the eNB, the UE transmits actual UL data to the eNB through an allocated PUSCH resource (S719).

Next, if the UE transmits the type-1 SR to the eNB, the eNB may perform a 3-step UL resource allocation procedure without a BRR request (i.e., UL resource allocation for the BSR and BSR transmission of the UE) through energy detection (e.g., on/off detection) in a resource of the type-1 SR.

That is, the eNB transmits to the UE the UL grant for the PUSCH resource for actual data transmission (S723).

Herein, the PUSCH resource allocated for actual data transmission may be determined according to a buffer size (e.g., 0<buffer size≤30) reported by the UE to the eNB through the type-1 SR in step S721. In addition, the eNB sets a soft buffer size (e.g., 90=30*3) corresponding to the buffer size.

The UE transmits actual data to the eNB through the PUSCH resource allocated by the UL grant from the eNB (S725).

Next, if the UE transmits the type-2 SR to the eNB, the eNB may perform a 3-step UL resource allocation procedure without a BRR request (i.e., UL resource allocation for the BSR and BSR transmission of the UE) through energy detection (e.g., on/off detection) in a resource of the type-2 SR.

That is, the eNB transmits to the UE the UL grant for the PUSCH resource for actual data transmission (S733).

Herein, the PUSCH resource allocated for actual data transmission may be determined according to a buffer size (e.g., 30<buffer size≤400) reported by the UE to the eNB through the type-2 SR in step S731. In addition, the eNB sets a soft buffer size (e.g., 1200=3*400) corresponding to the buffer size.

The UE transmits actual data to the eNB through the PUSCH resource allocated by the UL grant from the eNB (S735).

Figure 8:
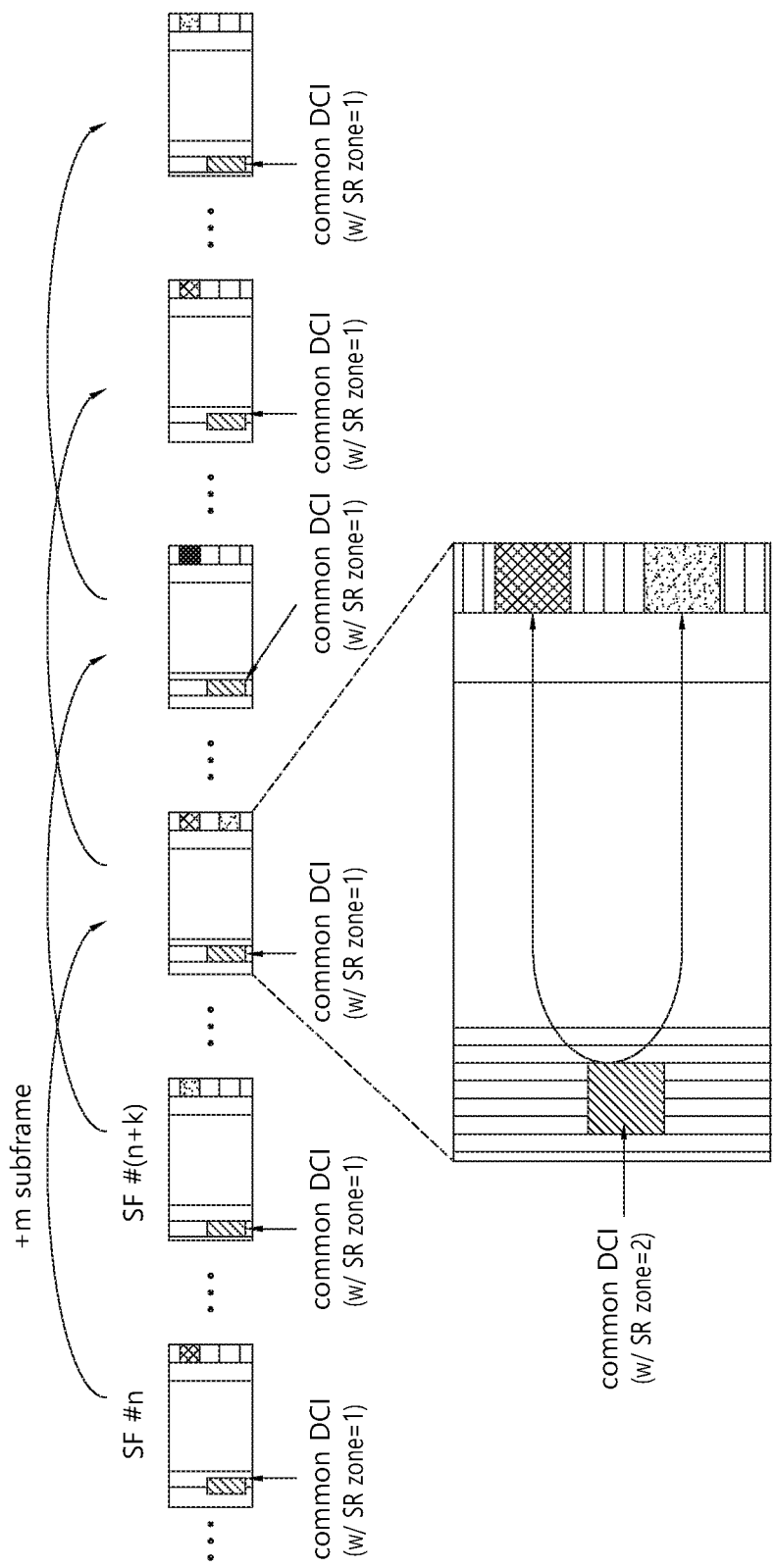
FIG. 8 shows an example of dynamically allocating an SR resource to a UE according to an embodiment of the present specification.

FIG. 8 shows an example of dynamically allocating an SR resource to a UE according to an embodiment of the present specification.

FIG. 8 shows an example of transmission in a time/frequency domain of an SR associated with common downlink control information (DCI). In the example of FIG. 8, an x-axis direction is a time domain, and a y-axis direction is a frequency domain.

The conventionally proposed scheme for dynamically allocating an SR resource is a scheme for dynamically configuring the SR resource by considering that an ACK/NACK resource of a UL channel changes dynamically according to a DL data amount. A representative example of a corresponding invention is as follows.

For example, an SR zone may be dynamically managed according to the DL data amount to decrease latency of an SR.

For another example, as shown in FIG. 8, a reserved resource of each subframe may be utilized for SR transmission through an SR zone-related field of the common DCI. The above embodiment supports an aperiodic SR.

Figure 9:
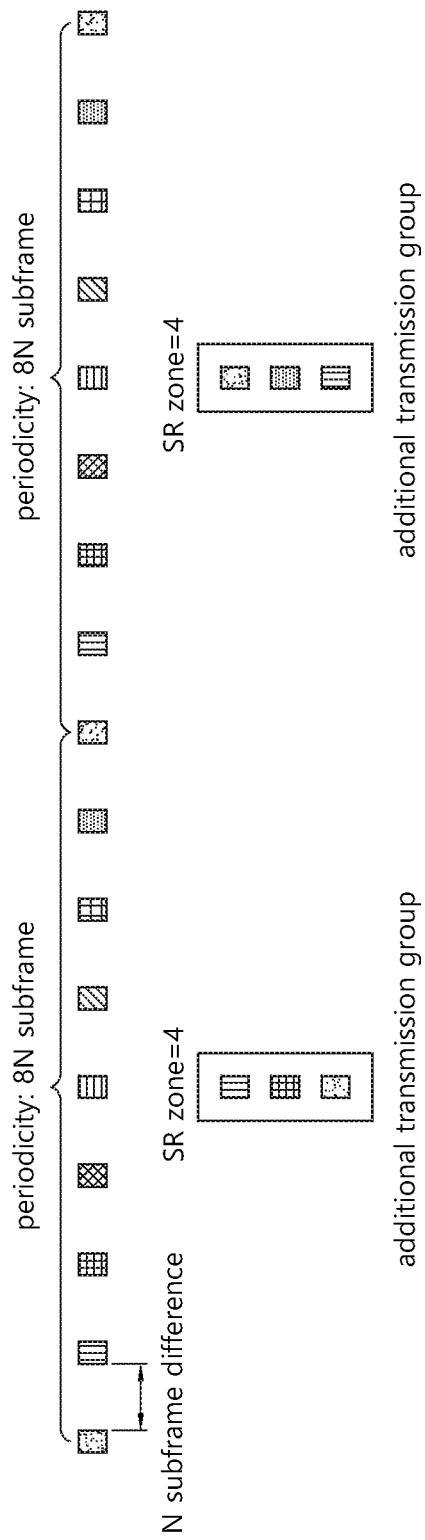
FIG. 9 shows an example of periodically allocating an additional SR resource to a UE according to an embodiment of the present specification.

FIG. 9 shows an example of periodically allocating an additional SR resource to a UE according to an embodiment of the present specification.

Unlike in FIG. 8, a periodic SR is supported in FIG. 9. FIG. 9 shows an example of allocating an additional SR resource for a case where a group transmission period is 8N and a value of an SR resource is 4. Referring to FIG. 9, it can be seen that one default SR resource and three additional SR resources are allocated every 8N period.

However, the aforementioned schemes may have several problems in scheduling of an SR resource in ultra-reliable low-latency communications (URLLC). A typical requirement of URLLC is to transmit data within 1 ms. To achieve the above purpose, the SR resource shall be allocated in a very short period less than or equal to 1 ms, and thus the overhead of SR resources is increased compared to the existing LTE. In addition thereto, a multi-level SR for transmitting a BSR together with an SR is considered to rapidly perform UL data transmission, and when the multi-level SR is applied, an SR resource for expressing N bits is required in general, which leads to a problem in that the overhead of the SR resource is more increased. Therefore, in URLLC, it is an important issue to effectively use the SR resource.

However, the method of semi-statically allocating the existing multi-level SR resource has a disadvantage in that, when the multi-level SR resource is allocated for one UE, the resource cannot be used for another UE for a long period of time. Therefore, resource efficiency can be more improved by dynamically allocating the multi-level SR resource. In addition, the existing method of flexibly allocating an SR zone is characterized in that an aperiodic SR resource is opportunistically allocated according to a DL data amount. Therefore, there is a disadvantage in that the aperiodic SR cannot be utilized for the purpose of satisfying a level of latency required in the URLLC.

In the present specification, the UE also includes a vehicle having a communication module installed therein, in addition to the existing mobile phone and smart phone. In the present specification, a TTI may be replaced with a subframe or a slot or a mini slot or a short TTI or a transmission unit.

Hereinafter, a scheme of effectively allocating a multi-level SR resource is described.

For example, an eNB informs a UE of a mapping relation between a buffer size level and a multi-level SR through an RRC message. In addition, the eNB indicates a level of applying the multi-level SR and a transmission resource of the multi-level SR to the UE through L1 signaling. When a UE to which an n-level SR resource is allocated intends to transmit an SR, the UE quantizes a buffer size level to an n-level according to a mapping relation previously indicated by the eNB and transmits it to the eNB. Herein, n=1, 2, . . . , N, where N is a maximum level of the multi-level SR.

In the above example, the level of applying the multi-level SR implies a level for quantizing the buffer size level. If the number of buffer size levels is 64 and a 3-level SR is allocated to the UE, the UE maps a buffer size of 64 levels to a buffer size of 3 levels and transmits it to the eNB according to a pre-agreed rule. For example, a 1-level SR may be mapped to buffer size levels 0 to 20, and a 2-level SR may be mapped to buffer size levels 21 to 40, and a 3-level SR may be mapped to buffer size levels 41 to 63.

Herein, since an optical mapping relation between the multi-level SR and the buffer size level is determined according to a feature of a service (or traffic) provided to the UE, preferably, it is configured semi-statically. Unlike this, a level of the SR resource may be dynamically configured according to a situation of a resource of a UL control channel. If an allocation period of the SR resource is determined by a target latency time of URLLC, preferably, a single level SR is periodically allocated in the multi-level SR, and a resource for expressing an additional level is dynamically allocated.

In addition, in the above example, a first SR resource is periodically and semi-statically allocated by the eNB through an RRC message (or RRC signaling), and an additional SR resource for expressing multiple levels (or a resource for expressing a BSR) is dynamically and aperiodically allocated by the eNB through L1 signaling.

The reason of semi-statically periodically allocating one SR resource to the UE is to allow the UE to constantly maintain a maximum value of a latency time for SR transmission. For example, a case is considered where one SR resource is allocated to the UE with a period of 0.25 ms and an SR resource for expressing an additional level is dynamically allocated according to a resource state of a UL control channel. In this case, a time for which the UE waits to transmit the SR is constantly maintained to up to 0.25 ms, and a level of accuracy of buffer status information transmitted by the UE together with the SR is adjusted according to the resource state of the UL control channel.

A UE to which an additional SR resource for expressing a multi-level SR is not allocated through L1 signaling transmits an SR by using an SR resource semi-statically allocated.

When the above example is applied, the eNB may selectively transmit L1 signaling for allocating an additional SR resource. Upon recognizing that the UE decodes a control channel but the additional SR resource is not allocated thereto, the SR may be transmitted by using one SR resource. Thereafter, the UE may transmit a buffer status report (BSR) after receiving a UL grant for the BSR from the eNB in a conventional manner, or may transmit UL data immediately after receiving a UL grant for UL data transmission.

In addition, RRC signaling for a mapping relation between a buffer size level and a multi-level SR includes the following information. That is, when the UE receives a UL grant from the eNB after transmitting the SR by using a 1-level SR, the RRC signaling includes information indicating whether BSR information is transmitted through an allocated UL data transmission resource.

If the UE restricts a packet size of UL traffic to be generated to a specific range, the eNB may indicate that additional BSR information will not be transmitted to the UE.

Figure 10:
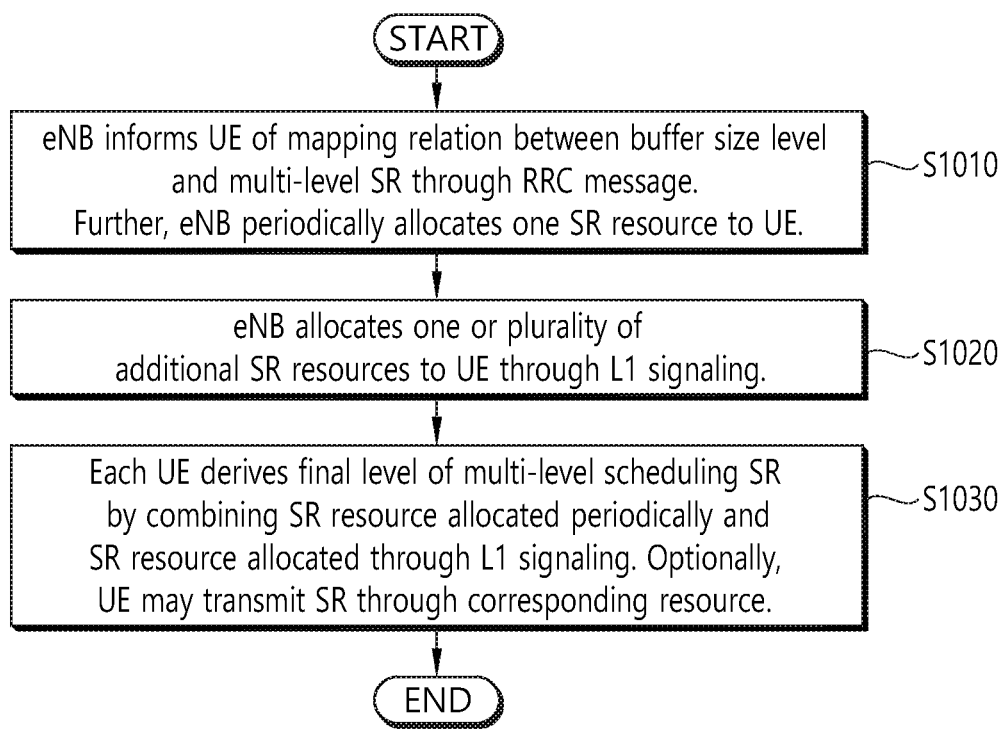
FIG. 10 is a flowchart illustrating a procedure of performing an SR by allocating a first SR resource and an additional SR resource to a UE according to an embodiment of the present specification.

FIG. 10 is a flowchart illustrating a procedure of performing an SR by allocating a first SR resource and an additional SR resource to a UE according to an embodiment of the present specification.

A main operational flow for a case where the aforementioned embodiment is applied is shown in FIG. 10.

In step S1010, an eNB informs a UE of a mapping relation between a buffer size level and a multi-level SR through an RRC message. In addition, the eNB periodically allocates one SR resource to the UE.

In step S1020, the eNB allocates one or a plurality of additional SR resources to the UE through L1 signaling.

In step S1030, each UE derives a final level of a multi-level scheduling SR by combining an SR resource (a first SR resource) allocated periodically and an SR resource (a second SR resource) allocated through L1 signaling. Optionally, the UE may transmit an SR through the first SR resource or the second SR resource.

For another example, a case is assumed where a maximum level of the multi-level SR. The eNB may transmit to the UE a mapping table with respect to an n-level SR and a buffer size level for all values n (case 1) or only a mapping table with respect to an N-level SR and a buffer size level (case 2).

The case where the mapping relation between the buffer size level and the n-level SR is transmitted for all values n has the following advantages and disadvantages. If a buffer size level is quantized, an optimal mapping method may vary depending on the value n. Therefore, if the eNB transmits the mapping table to the UE for all values n, there is an advantage in that the optimal mapping method can be utilized whenever the UE applies the multi-level SR, whereas there is a disadvantage in that an overhead of RRC signaling is increased.

Unlike this, when the eNB transmits only the mapping relation between the N-level SR and the buffer size level to the UE, there is a disadvantage in that the optimal mapping rule is not always applicable although the overhead of the RRC signaling is decreased. The mapping relation between the N-level SR and the buffer size level and the rule applied when the N-level SR and the buffer size level is mapped may be defined with system information. For example, in the n-level SR, a method of mapping only up to n may be applied among mapping methods of the N-level SR.

For another example, an additional SR resource may be allocated to the UE in both a TTI with a periodically allocated SR resource and a TTI without it. However, a different SR level is applied to a case of the TTI with the periodically allocated SR resource (case 1) and a case of the TTI without the periodically allocated SR resource (case 2). In case 1, the UE derives a level of the SR resource by combining a level of the SR resource periodically allocated and a level of the SR resource additionally allocated e. In case 2, the UE determines the level of the SR resource by using only an aperiodic resource additionally allocated.

The above embodiment may be explained separately for options 1 to 4. It is assumed in the operations 1 to 4 that the number of SR resources periodically allocated to the UE is m1, and the number of SR resources additionally allocated is m2. It is also assumed that a level of the SR resource periodically allocated to the UE is n1, and a level of the SR resource additionally allocated is n2.

Option 1: A case is assumed where one SR is expressed with a sequence to which on/off keying is applied, and N SR levels are expressed with N sequences. The on/off keying is a modulation scheme for transmitting information by turning on and off a carrier to 1 and 0. In this case, a UE operates as follows. In case 1, the UE maps a buffer size level to (m1+m2) SR resource levels, and transmits an SR. In case 2, the UE maps the buffer size level to m2 SR resource levels, and transmits the SR.

In the option 1, n1=m1, and n2=m2. If a signal is transmitted on all of the (m1+m2) SR resources allocated to the UE when a multi-level SR is transmitted, maximum transmission power per SR resource is decreased, and thus coverage of the UE is decreased. However, when a scheme of the option 1 is applied, since the UE transmits a signal by selecting only one SR resource among the (m1+m2) SR resources, there is an advantage in that coverage is constantly maintained.

Option 2: A case is assumed where one SR is expressed with a sequence to which on/off keying is applied, and ($2^N$−1) SR levels are expressed with N sequences. In this case, a UE operates as follows. In case 1, the UE maps a buffer size level to ($2^{m1+m2}$−1) SR resource levels, and transmits an SR. In case 2, the UE maps the buffer size level to $2^{m2}$ SR resource levels, and transmits the SR.

In the above embodiment, n1=$2^{m1}$−1, and n2=$2^{m2}$−1. The above scheme has a greater amount of information that can be expressed compared to the scheme of the option 1, but has a high probability that the eNB incorrectly decides buffer size information transmitted by the UE due to miss direction or false alarm or the like.

Option 3: A case is assumed where one SR resource is expressed with a sequence or symbol which expresses 1 or 0, and $2^N$ SR levels are expressed with N resources. In this case, a UE operates as follows. In case 1, the UE maps a buffer size level to $2^{m1+m2}$ SR resource levels, and transmits an SR. In case 2, the UE maps the buffer size level to $2^{m2}$ SR resource levels, and transmits the SR.

In the option 3, n1=$2^{m1}$, and n2=$2^{m2}$. In the option 3, it is assumed that the eNB uses a reference signal transmitted by the UE to recognize whether an SR is transmitted, and thereafter recognizes a buffer status through modulation.

Option 4: An SR periodically allocated is a sequence to which applies on/off keying is applied, and m1=n1=1. In addition, regarding the SR additionally allocated, it is assumed that one SR resource is expressed with a sequence or symbol which expresses 1 or 0. In this case, a UE operates as follows. In case 1, the UE maps a buffer size level to $2^{m2}$ SR resource levels, and transmits an SR. In case 2, the UE maps the buffer size level to $2^{m2}$ SR resource levels, and transmits the SR.

The followings are assumed in the option 4. In case 1, it is assumed that an SR resource additionally allocated to the UE is utilized to indicate a buffer status, and in case 2, it is assumed that a reference signal of an SR resource additionally allocated to the UE is utilized to detect whether a reference signal of the SR resource additionally allocated to the UE is transmitted and a buffer status is recognized through modulation.

For another example, an SR sequence length $L_{SR}$ and ACK/NACK sequence length $L_{ACK}$ of a UL control channel are set to be integer multiples of each other. For example, it may be set to $L_{SR}=m*L_{ACK}$ or $L_{ACK}=m*L_{SR}$ (m=1, 2, 3, . . . ).

The above scheme has an advantage in that a resource can be effectively allocated when a resource not used for ACK/NACK transmission is allocated for an SR sequence.

When a multi-level SR resource is allocated through L1 signaling: (1) an SR resource is implicitly reported through the number of SR resources additionally allocated; or (2) a level of an SR resource additionally allocated is explicitly reported.

Hereinafter, a scheme of setting a buffer size of a multi-level SR and an SR transmission scheme are proposed by considering a case where a UE fails to receive an L1 control signal for resource allocation of a multi-level SR. In the following embodiment, a case is assumed where a periodic SR resource allocated to the UE is a sequence detected using an on-off keying scheme.

Figure 11:
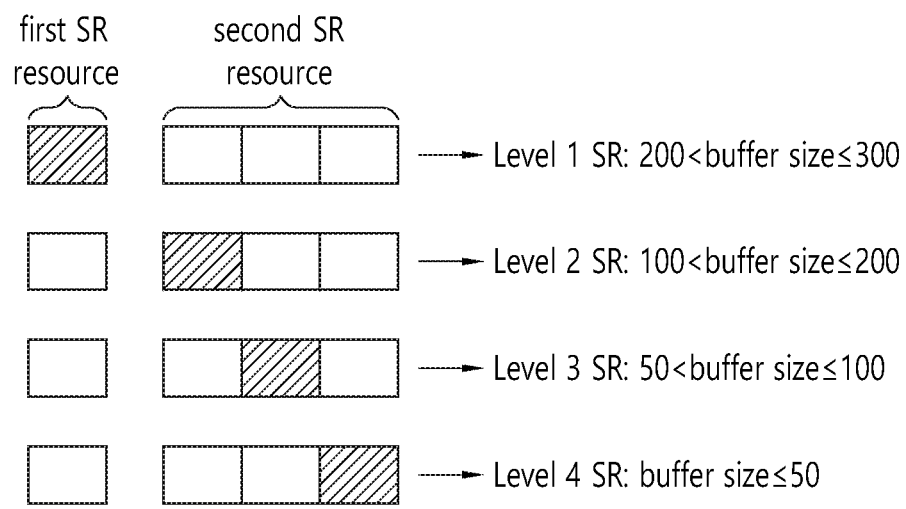
FIG. 11 shows an example of mapping between an SR resource and a buffer size according to an embodiment of the present specification.

FIG. 11 shows an example of mapping between an SR resource and a buffer size according to an embodiment of the present specification.

Referring to FIG. 11, a periodic SR resource semi-statically allocated to a UE is referred to as a first SR resource, and an SR resource dynamically allocated through an L1 control signal is referred to as a second SR resource. A minimum value of buffer sizes to be mapped when an SR is transmitted only on the first SR resource is denoted by $B_{1,min}$. A maximum value of buffer sizes to be mapped when the SR is transmitted on both the first SR resource and the second SR resource. In this case, the buffer size is set to satisfy: $B_{1,min} \geq B_{2,max}$.

For example, a buffer size for a case where only one sequence is allocated on the first SR resource and an SR is transmitted on the first SR resource is denoted by B1. In addition, buffer sizes mapped when the SR is transmitted on both the first SR resource and the second SR resource are denoted by B2, B3 . . . , BN. In this case, the buffer size is set to satisfy: B1≥Bi for all Bi, i=2, 3, . . . , N.

By applying the above scheme, additional latency can be prevented when the UE fails to receive an L1 control signal for allocating a second SR resource. There may be a case where the UE fails to receive the L1 control signal for allocating the second SR resource and thus transmits the SR by utilizing only the first SR resource. In this case, since the eNB allocates a UL resource to the UE on the basis of a greatest buffer size among pre-set buffer sizes, the UE may transmit UL data without the additional latency. This is because B1 is always greater than or equal to Bi.

FIG. 11 shows an example of a mapping relation of an SR resource and a buffer size. In FIG. 11, a square means a logical SR resource, and a shaded square means that an SR is transmitted on a corresponding resource.

Referring to FIG. 11, $B_{1,min}$ is 200. In case of a level-2 SR, $B_{2,max}$ is 200. In case of a level-3 SR, $B_{2,max}$ is 100. In case of a level-4 SR, $B_{2,max}$ is 50.

For another example, a sequence for on/off detection is transmitted on a first SR resource, and n bits may be encoded and then transmitted on a second SR resource. In this case, upon generation of UL data, the UE always transmits an SR on the first SR resource irrespective of whether the second SR resource is allocated. That is, when a signal is transmitted on the second SR resource, a signal is always transmitted on the first SR resource.

As in the above embodiment, if the second SR resource is detected such as CQI or ACK/NACK, there is a limitation when the eNB recognizes whether the SR is received by using the second SR resource. Therefore, upon generation of UL traffic, preferably, a signal is always transmitted on the first SR resource.

For another example, a case is assumed where one SR is expressed with a sequence to which on/off keying is applied, and $(2^N-1)$ SR levels are expressed with N sequences. Since a false alarm probability is generally lower than a miss detection probability, when the UE transmits L SR sequences, a probability that the eNB detects (L−1) SR sequences is higher than a probability that the eNB detects (L+1) SR sequences. Therefore, buffer sizes mapped when L SR sequences are transmitted are preferably set to be greater than a buffer size mapped when (L+1) SR sequences are transmitted.

Buffer sizes mapped when L SR sequences are transmitted are denoted by $B_{L,i}$, and buffer sizes mapped when (L+1) SR sequences are transmitted are denoted by $B_{L+1,j}$. Herein, i and j are integers. In this case, the buffer size is designated to satisfy the following relation.

$$\min_i B_{L,i} \geq \max_j B_{L+1,j} \quad \text{[Equation 1]}$$

When the buffer size is set to satisfy the relation of the equation 1 above, a case where the buffer size recognized by the eNB is less than the buffer size transmitted by the UE can be reduced. That is, the eNB recognizes the buffer size to be greater than or equal to the buffer size transmitted by the UE, thereby avoiding occurrence of latency.

Figure 12:
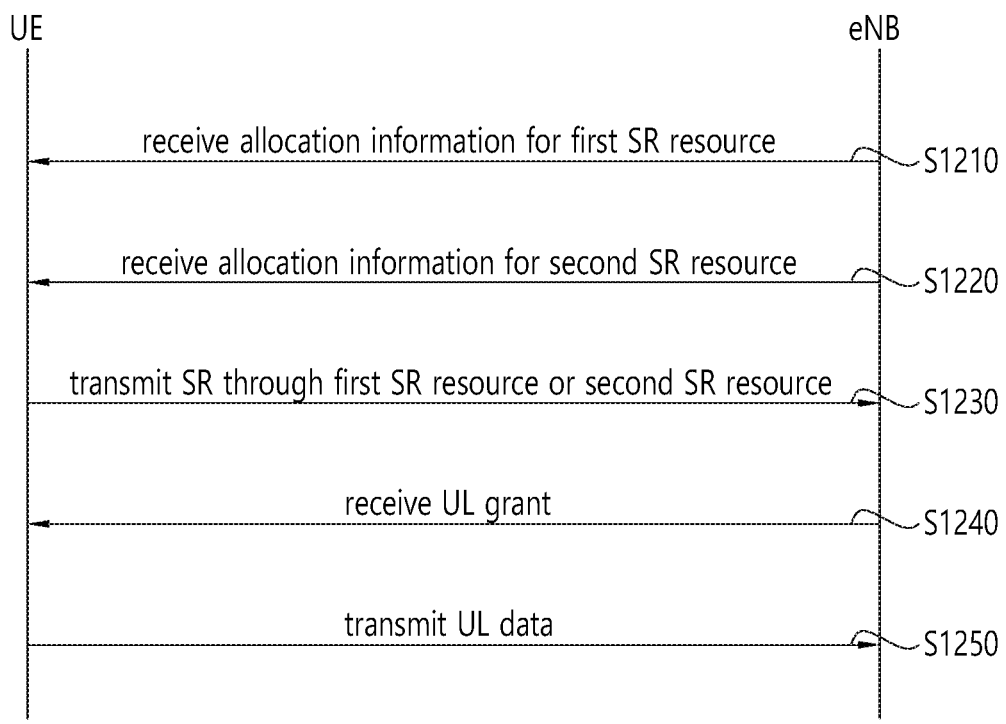
FIG. 12 shows a procedure of performing an SR for uplink data transmission according to an embodiment of the present specification.

FIG. 12 shows a procedure of performing a scheduling request for UL data transmission according to an embodiment of the present specification.

The present embodiment proposes a scheme of performing a multi-level scheduling request. The multi-level scheduling request is a scheme of simultaneously transmitting a scheduling request (SR) and a BSR by allocating not only the existing SR but also an additional SR resource. Additional BSR transmission can be omitted by using the multi-level SR scheme.

Summarizing terminologies, a first SR resource may correspond to the existing SR resource. Therefore, if only the first SR resource is allocated, a single-level SR is performed. A second SR resource may correspond to an additional SR resource additionally allocated for a BSR. A multi-level SR can be performed by using the first SR resource and/or the second SR resource.

In step S1210, a UE receives allocation information for the first SR resource from an eNB. The first SR resource is semi-statically and periodically allocated. However, the allocation information for the first SR resource may be aperiodically received. In this case, the allocation information for the first SR resource may be received through a radio resource control (RRC) message.

In step S1220, the UE receives allocation information for a second SR resource from the eNB. The second SR resource is dynamically and aperiodically allocated. The second SR resource is additionally allocated in addition to the first SR resource for a buffer status report (BSR). In this case, the allocation information for the second SR resource may be received through L1 signaling.

The second SR resource may be allocated according to a resource state of a UL control channel. Specifically, the second SR resource may be allocated to a resource other than a resource allocated to transmit channel quality information (CQI) or ACK/NACK for DL data in the UL control channel That is, when the eNB does not dynamically schedule DL data, the second SR resource may be allocated to the remaining resource of the UL control channel. In this case, the UL control channel is a physical uplink control channel (PUCCH).

That is, in the present embodiment, the eNB may allocate a multi-level SR resource by combining a semi-statistic scheduling scheme and a dynamic scheduling scheme.

In step S1230, the UE transmits an SR to the eNB through the first SR resource or the second SR resource In step S1240, the UE receives a UL grant determined according to a resource on which the SR is transmitted from the eNB.

In step S1250, the UE transmits the UL data through a UL data channel allocated by the UL grant. In this case, the UL control channel is a physical UL control channel (PUCCH).

If the resource on which the SR is transmitted is the first SR resource, the RRC message may include information indicating whether the BSR is transmitted through the UL data channel.

When the resource on which the SR is transmitted is the first SR resource and the second SR resource, the BSR may be transmitted together with the SR. That is, according to a multi-level SR in which the first SR resource and the second SR resource are used, the UE may transmit the SR and the BSR simultaneously to the eNB through the multi-level SR resource.

For this, the allocation information for the first SR resource includes mapping information between buffer size information and the first and second SR resources. Accordingly, an optimal mapping relation between the multi-level SR and the buffer size information (or level) may be determined.

When the UE fails to receive the allocation information for the second SR resource, the SR may be transmitted only through the first SR resource. The buffer size information may include a first buffer size level mapped to the first SR resource and a second buffer size level mapped to the second SR resource. A minimum buffer size of the first buffer size level may be greater than or equal to a maximum buffer size of the second buffer size level. The first SR resource allocated semi-statically and periodically is more reliable than the second SR resource allocated dynamically and aperiodically. Therefore, upon failure in reception of the allocation information for the second SR resource, the UE may transmit the SR by using only the first SR resource. In this case, since a first buffer size level which is mapped to the first SR resource may be the greatest buffer size, the UE may transmit UL data without an additional latency.

The first buffer size level and the second buffer size level may correspond to values obtained by quantizing a buffer size of the UL data on a size basis.

In addition, the SR may always be transmitted through the first SR resource irrespective of whether the allocation information for the second SR resource is successfully received.

In addition, the SR may correspond to a sequence to which an on-off keying scheme is applied. A buffer size included in the buffer size information for a case where the SR is transmitted using L sequences may be set to be greater than or equal to a buffer size included in the buffer size information for a case where the SR is transmitted using (L+1) sequences. This is because a probability of detecting a smaller number of SR sequences is higher than a probability of detecting a greater number of SR sequences. In this case, L is a natural number.

Figure 13:
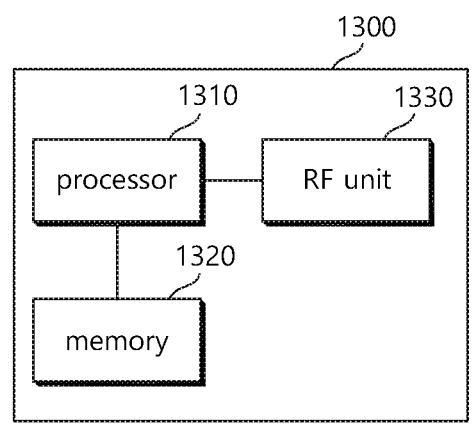
FIG. 13 is a block diagram showing an apparatus for wireless communication for implementing an embodiment of the present invention.

FIG. 13 is a block diagram showing an apparatus for wireless communication for implementing an embodiment of the present invention.

An apparatus 1300 for wireless communication includes a processor 1310, a memory 1320 and a radio frequency (RF) unit 1330.

The processor 1310 may be configured to implement proposed functions, procedures and/or methods described in this description. Layers of the radio interface protocol may be implemented in the processor 1310. The processor 1310 may handle a procedure explained above. The memory 1320 is operatively coupled with the processor 1310, and the RF unit 1330 is operatively coupled with the processor 1310.

The processor 1310 may include application-specific integrated circuit (ASIC), other chipset, logic circuit and/or data processing device. The memory 1320 may include read-only memory (ROM), random access memory (RAM), flash memory, memory card, storage medium and/or other storage device. The RF unit 1330 may include baseband circuitry to process radio frequency signals. When the embodiments are implemented in software, the techniques described herein can be implemented with modules (e.g., procedures, functions, and so on) that perform the functions described herein. The modules can be stored in memory 1320 and executed by processor 1310. The memory 1320 can be implemented within the processor 1310 or external to the processor 1310 in which case those can be communicatively coupled to the processor 1310 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the scope of the appended claims.

What is claimed is:

1. A method of performing a scheduling request (SR) for transmitting uplink data in a wireless communication system, the method comprising:
   receiving, by a terminal, allocation information for a first SR resource from a base station, wherein the first SR resource is semi-statically and periodically allocated;
   receiving, by the terminal, allocation information for a second SR resource from the base station, wherein the second SR resource is dynamically and aperiodically allocated, and the second SR resource is additionally allocated in addition to the first SR resource for a buffer status report (BSR); and
   transmitting, by the terminal, the SR to the base station through the first SR resource or the second SR resource,
   wherein the allocation information for the first SR resource comprises mapping information between buffer size information and the first and second SR resources,
   wherein the buffer size information comprises a first buffer size level mapped to the first SR resource and a second buffer size level mapped to the second SR resource,
   wherein a minimum buffer size of the first buffer size level is greater than or equal to a maximum buffer size of the second buffer size level, and
   wherein when the terminal fails to receive the allocation information for the second SR resource, the SR is transmitted only through the first SR resource.

2. The method of claim 1,
   wherein the allocation information for the first SR is received through a radio resource control (RRC) message,
   wherein the allocation information for the second SR is received through L1 signaling, and
   wherein the second SR resource is allocated according to a resource state of an uplink control channel.

3. The method of claim 2, wherein the second SR resource is allocated to a resource other than a resource allocated to transmit channel quality information (CQI) or ACK/NACK for downlink data in the uplink control channel.

4. The method of claim 2, further comprising:
   receiving, by the terminal from the base station, an uplink (UL) grant determined according to a resource on which the SR is transmitted; and
   transmitting, by the terminal, the uplink data through an uplink data channel allocated by the UL grant,
   wherein the uplink control channel is a physical uplink control channel (PUCCH), and
   wherein the uplink data channel is a physical uplink shared channel (PUSCH).

5. The method of claim 4, wherein when the SR is transmitted through the first SR resource, the RRC message comprises information indicating whether the BSR is transmitted through the uplink data channel.

6. The method of claim 4, wherein when the SR is transmitted through the first SR resource and the second SR resource, the BSR is transmitted together with the SR through the second SR resource.

7. The method of claim 1, wherein the first buffer size level and the second buffer size level are values obtained by quantizing a buffer size of the uplink data on a size basis.

8. The method of claim 1, wherein the SR is always transmitted through the first SR resource irrespective of whether the allocation information for the second SR resource is successfully received.

9. The method of claim 1,
wherein the SR relates to a sequence to which an on-off keying scheme is applied, and
wherein a buffer size comprised in the buffer size information for a case where the SR is transmitted using L sequences is set to be greater than or equal to a buffer size comprised in the buffer size information for a case where the SR is transmitted using (L+1) sequences, where L is a natural number.

10. A terminal for performing a scheduling request (SR) for transmitting uplink data in a wireless communication system, the terminal comprising:
a radio frequency (RF) unit transmitting or receiving a radio signal; and
a processor controlling the RF unit, wherein the processor is configured to:
receive allocation information for a first SR resource from a base station, wherein the first SR resource is semi-statically and periodically allocated;
receive allocation information for a second SR resource from the base station, wherein the second SR resource is dynamically and aperiodically allocated, and the second SR resource is additionally allocated in addition to the first SR resource for a buffer status report (BSR); and
transmit the SR to the base station through the first SR resource or the second SR resource,
wherein the allocation information for the first SR resource comprises mapping information between buffer size information and the first and second SR resources,
wherein the buffer size information comprises a first buffer size level mapped to the first SR resource and a second buffer size level mapped to the second SR resource,
wherein a minimum buffer size of the first buffer size level is greater than or equal to a maximum buffer size of the second buffer size level, and wherein when the terminal fails to receive the allocation information for the second SR resource, the SR is transmitted only through the first SR resource.

11. The terminal of claim 10,
wherein the allocation information for the first SR is received through a radio resource control (RRC) message,
wherein the allocation information for the second SR is received through L1 signaling, and
wherein the second SR resource is allocated according to a resource state of an uplink control channel.

12. The terminal of claim 11,
wherein the second SR resource is allocated to a resource other than a resource allocated to transmit channel quality information (CQI) or ACK/NACK for downlink data in the uplink control channel.

13. The terminal of claim 11, wherein the processor is configured to:
allow the terminal to receive from the base station an uplink (UL) grant determined according to a resource on which the SR is transmitted; and
allocate the terminal to transmit the uplink data through an uplink data channel allocated by the UL grant,
wherein the uplink control channel is a physical uplink control channel (PUCCH), and
wherein the uplink data channel is a physical uplink shared channel (PUSCH).

14. The terminal of claim 13, wherein when the SR is transmitted through the first SR resource, the RRC message comprises information indicating whether the BSR is transmitted through the uplink data channel.

15. The terminal of claim 13, wherein when the SR is transmitted through the first SR resource and the second SR resource, the BSR is transmitted together with the SR through the second SR resource.

16. The terminal of claim 10, wherein the first buffer size level and the second buffer size level are values obtained by quantizing a buffer size of the uplink data on a size basis.

17. The terminal of claim 10, wherein the SR is always transmitted through the first SR resource irrespective of whether the allocation information for the second SR resource is successfully received.

18. The terminal of claim 10,
wherein the SR relates to a sequence to which an on-off keying scheme is applied, and
wherein a buffer size comprised in the buffer size information for a case where the SR is transmitted using L sequences is set to be greater than or equal to a buffer size comprised in the buffer size information for a case where the SR is transmitted using (L+1) sequences, where L is a natural number.

* * * * *